(12) United States Patent
Kolesnikov et al.

(10) Patent No.: US 9,178,704 B2
(45) Date of Patent: Nov. 3, 2015

(54) INPUT CONSISTENCY VERIFICATION FOR SERVER ASSISTED SECURE FUNCTION EVALUATION

(71) Applicant: Alcatel-Lucent USA Inc., Murray Hill, NJ (US)

(72) Inventors: Vladimir Y. Kolesnikov, Jersey City, NJ (US); Ranjit Kumaresan, College Park, MD (US); Abdullatif Shikfa, Villebon-sur-Yvette (FR)

(73) Assignee: Alcatel Lucent, Boulogne-Billancourt (FR)

( * ) Notice: Subject to any disclaimer, the term of this patent is extended or adjusted under 35 U.S.C. 154(b) by 392 days.

(21) Appl. No.: 13/630,533

(22) Filed: Sep. 28, 2012

(65) Prior Publication Data
US 2014/0095861 A1    Apr. 3, 2014

(51) Int. Cl.
*H04L 29/06*    (2006.01)
*H04L 9/32*    (2006.01)

(52) U.S. Cl.
CPC ............... *H04L 9/32* (2013.01); *H04L 9/3218* (2013.01); *H04L 2209/12* (2013.01); *H04L 2209/46* (2013.01); *H04L 2209/50* (2013.01)

(58) Field of Classification Search
USPC .......................................................... 380/28
See application file for complete search history.

(56) References Cited

U.S. PATENT DOCUMENTS

| 7,240,198 B1 * | 7/2007 | Pinkas et al. ................... 713/168 |
| 2009/0187757 A1 * | 7/2009 | Kerschbaum ................. 713/153 |

OTHER PUBLICATIONS

Seny Kamara, Payman Mohassel and Ben Riva, "Salus: A System for Server-Aided Secure Function Evaluation", ACM 978-1-4503-1651-4/12/10, CCS'12 Oct. 16-18, 2012, p. 797-808.*
Baechler et al., U.S. Appl. No. 13/017,449, "Secure Two-Party Computation Against Malicious Adversaries" filed Jan. 31, 2011.
Kolesnikov et al., U.S. Appl. No. 13/562,640, "Secure Function Evaluation Between Semi-Honest Parties" filed Jul. 31, 2012.
Kolesnikov et al., U.S. Appl. No. 13/562,690 "Secure Function Evaluation for a Covert Client and a Semi-Honest Server Using String Selection Oblivious Transfer" filed Jul. 31, 2012.

* cited by examiner

*Primary Examiner* — Joseph P Hirl
*Assistant Examiner* — Chi Nguy
(74) *Attorney, Agent, or Firm* — Ryan, Mason & Lewis, LLP

(57) ABSTRACT

Server-assisted secure function evaluation (SFE) is performed with input consistency verification for two parties that want to evaluate a function. The server computes a garbled circuit corresponding to the function. A predefined bit of the 0-secret of wire i in the garbled circuit is set to a random bit $b_i$ and a predefined bit of the 1-secret of wire i in the garbled circuit is set to $\neg b_i$. The server communicates with each party using an Oblivious Transfer (OT) to provide encrypted versions of the respective inputs of each party. Each party receives the encrypted wire secret of the other party and the garbled circuit for computation of a respective output and stores the predefined bit of a wire of interest of the other party. A given party can verify input consistency by the other party over at least two executions by comparing the values stored by the given party for the at least two executions with corresponding values obtained from the server.

22 Claims, 4 Drawing Sheets

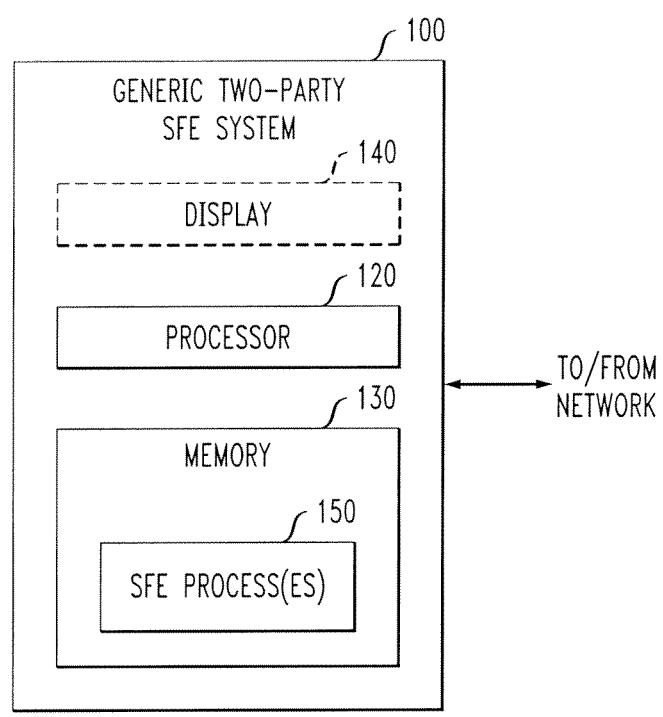

FIG. 2

1. $S$ and $P_1$ participate in $m$ OT instances in the following way. In the $j$-th instance:
   - $S$ acts as sender with input $(\tilde{u}_{i,j}^0, \tilde{u}_{i,j}^1)$.
   - $P_1$ acts as receiver with input $x_{i,j}$.
   - $P_1$ obtains $\tilde{u}'_{i,j}$ as output.

2. $S$ and $P_2$ participate in $n$ OT instances in the following way. In the $j$-th instance:
   - $S$ acts as sender with input $(\tilde{v}_{i,j}^0, \tilde{v}_{i,j}^1)$.
   - $P_2$ acts as receiver with input $y_{i,j}$.
   - $P_2$ obtains $\tilde{v}'_{i,j}$ as output.

3. For each $j \in I_2$, $S$ send $H(\tilde{v}_{i,j}^0), H(\tilde{v}_{i,j}^1)$ in random order to $P_1$. Let $P_1$ receive these as $\{g_{i,j}, g'_{i,j}\}_{j \in I_2}$.

4. For each $j \in I_1$, $S$ sends $H(\tilde{u}_{i,j}^0), H(\tilde{u}_{i,j}^1)$ in random order to $P_2$. Let $P_2$ receive these as $\{h_{i,j}, h'_{i,j}\}_{j \in I_1}$.

5. $P_1$ sends $\{\tilde{u}'_{i,j}\}_{j \in I_1}$ to $P_2$.

6. $P_2$ sends $\{\tilde{v}'_{i,j}\}_{j \in I_2}$ to $P_1$.

7. $P_1$ aborts the protocol if for some $j \in I_2, H(\tilde{v}'_{i,j}) \notin \{g_{i,j}, g'_{i,j}\}$ holds.

8. $P_2$ aborts the protocol if for some $j \in I_1, H(\tilde{u}'_{i,j}) \notin \{h_{i,j}, h'_{i,j}\}$ holds.

9. $S$ sends the garbled circuit $\tilde{C}_i$ to both $P_1$ and $P_2$.

10. Using keys $\{\tilde{v}'_{i,j}\}_{j \in I_2}$ and $\{\tilde{u}'_{i,j}\}_{j \in I_1}$, $P_1$ and $P_2$ evaluate $\tilde{C}_i$ to obtain output $z$.

FIG. 3

Algorithm GarbGen($i$, $C_i$, $id_1$, $id_2$, $\sigma$).

In $C_i$, let $u_{i,j}$ and $v_{i,j}$ represent the input wires corresponding to $P_1$ whose client id is $id_1$ and $P_2$ whose client id is $id_2$ respectively.

— For every $w_{i,j}$ that is an input wire of either $P_1$ or $P_2$, do the following:
  1. Set $\hat{w}_{i,j} := H'(i \| j \| id_1 \| id_2 \| \sigma)$. (Recall. $H'$'s output is one-bit.)
  2. Choose $r_0, r_1 \leftarrow \{0,1\}^{\kappa-1}$ at random.
  3. Set $\tilde{w}_{i,j}^0 := r_0 \| \hat{w}_{i,j}$.
  4. Set $\tilde{w}_{i,j}^1 := r_1 \| (1 \oplus \hat{w}_{i,j})$.

— For every internal wire $w_{i,j}$ of $C_i$, choose $\tilde{w}_{i,j}^0, \tilde{w}_{i,j}^1 \leftarrow \{0,1\}^{\kappa}$.

— For each gate $G$ in $C_i$ do the following: Let the gate index of $G$ be $\ell$. Suppose $w_1$ and $w_2$ represent input wires, and $w_3$ represent the output wires of gate $G$. For $j \in \{1, 2, 3\}$, let $\tilde{w}_j^0, \tilde{w}_j^1$ represent the garblings corresponding to 0 and 1 respectively. Given this, the garbled table $\tilde{T}$, corresponding to gate $G$ with gate function $g$, in $C_i$ consists of random permutation of the set $\{E(\tilde{w}_1^{b_1} \| \tilde{w}_2^{b_2} \| i \| \ell) \oplus \tilde{w}_3^{g(b_1, b_2)}\}_{b_1, b_2 \in \{0,1\}}$. (Recall $E$ is a random oracle.)

Setup: $S$ chooses random seed $\sigma \leftarrow \{0,1\}^\kappa$.

Evaluation: In the $i$-th execution:

- $P_1$ and $P_2$ provide $C_i$ to $S$. If submissions of $P_1$ and $P_2$ differ, the server aborts.
- $S$ creates $\widetilde{C}_i \leftarrow \mathsf{GarbGen}(i, C_i, \mathsf{id}_1, \mathsf{id}_2, \sigma)$.
- $S$ uses $\widetilde{C}_i$ as the garbled circuit, and participates in Protocol 200 with $P_1$ and $P_2$. At the end of the protocol, $P_1$ and $P_2$ obtain their respective outputs of the execution.
- For $w_{i,j}$ that represents the input wire of either $P_1$ or $P_2$, both $P_1$ and $P_2$ do the following.
  • Set $\widehat{w}'_{i,j}$ to the last bit of $\widetilde{w}'_{i,j}$.
  • Add $\widehat{w}'_{i,j}$ to the local state.

410

420 — Consistency Verification:

425 — Both $P_1$ and $P_2$ specify $(i_1, j_1, i_2, j_2)$ to $S$. If submissions of $P_1$ and $P_2$ differ, the server aborts.

430 — $S$ retrieves $\widehat{w}_{i_1,j_1} \leftarrow H'(i_1 \| j_1 \| \mathsf{id}_1 \| \mathsf{id}_2 \| \sigma)$, and $\widehat{w}_{i_2,j_2} \leftarrow H'(i_2 \| j_2 \| \mathsf{id}_1 \| \mathsf{id}_2 \| \sigma)$. $S$ sends the bit $(\widehat{w}_{i_1,j_1} \oplus \widehat{w}_{i_2,j_2})$ to both $P_1$ and $P_2$. Denote the bit received by $P_1$ and $P_2$ as $c$.

435 — $P_1$ and $P_2$ retrieve $\widehat{w}'_{i_1,j_1}$ and $\widehat{w}'_{i_2,j_2}$ from their local state, and check if $c \stackrel{?}{=} \widehat{w}'_{i_1,j_1} \oplus \widehat{w}'_{i_2,j_2}$. If the check fails then the execution is aborted.

INPUT CONSISTENCY VERIFICATION FOR SERVER ASSISTED SECURE FUNCTION EVALUATION

STATEMENT OF GOVERNMENT RIGHTS

The present invention was made in connection with work performed under the Intelligence Advanced Research Projects Activity (IARPA) via Department of the Interior (DOI) Contract No. D11PC20194.

FIELD OF THE INVENTION

The present invention relates generally to techniques for securing electronic transactions and, more particularly, to secure function evaluation (SFE) techniques that provide privacy to the parties of such electronic transactions.

BACKGROUND OF THE INVENTION

Server-assisted secure function evaluation (SFE) allows two parties to evaluate any function on their respective inputs x and y with the assistance of a server, while maintaining the privacy of both x and y. Efficient SFE algorithms enable a variety of electronic transactions, previously impossible due to mutual mistrust of participants. For example, SFE algorithms have been employed in auctions, contract signing and distributed database mining applications. The problem of secure computation has been solved for both semi-honest and malicious players. Generally, having access to a semi-honest server resolves the problem of malicious circuit generation. As computation and communication resources have increased, SFE has become practical for common use. A malicious SFE model provides a guarantee of complete privacy of the players' inputs. Existing server-assisted SFE algorithms typically employ Garbled Circuits (GCs). For a detailed discussion of GCs, see, for example, Y. Lindell and B. Pinkas, "A Proof of Yao's Protocol for Secure Two-Party Computation," Journal of Cryptology, 22(2):161-188 (2009).

While such existing server-assisted SFE algorithms have significantly improved the privacy of two party transactions, a number of limitations remain, which, if overcome, could further improve the efficiency, utility and/or security of generic two-party SFE algorithms. For example, in the case of multiple SFE executions between the same parties, there is a need for verifying input consistency between executions. Consider profile matching and match ratio computation. These are the underlying functionalities, for example, in online dating, resume/job matching, profiling for advertisement and other services. In many of these applications, it is important that users cannot manipulate their inputs to extract maximum benefit, but, rather, that the user inputs are consistent among executions. For example, a corporation is running a promotion campaign targeting a certain demographic, and other users should not be able to improperly adjust their profiles to take advantage of the promotion.

A need therefore exists for techniques for ensuring input consistency that allow a party to prove he or she is using the same input that was used in a prior execution.

SUMMARY OF THE INVENTION

Generally, methods and apparatus are provided for input consistency verification for server assisted secure function evaluation. According to one aspect of the invention, secure function evaluation (SFE) is performed by a server for two parties that want to evaluate a function by computing a garbled circuit corresponding to the function and wherein a predefined bit of the 0-secret of wire i in the garbled circuit is set to a random bit $b_i$ and a predefined bit of the 1-secret of wire i in the garbled circuit is set to $\neg b_i$; and communicating with each of the parties using an Oblivious Transfer (OT) protocol to provide wire secrets that are encrypted versions of the respective inputs of each party, wherein each party provides the encrypted wire secret of the party to the other of the party; sending the computed garbled circuit to each party for computation of a respective output; and wherein each party stores the predefined bit of a wire of interest of the other party, and wherein a given party can verify input consistency by the other party over at least two executions by comparing the values stored by the given party for the at least two executions with corresponding values obtained from the server.

According to one aspect of the invention, secure function evaluation (SFE) is performed by a first of the two parties that want to evaluate a function with assistance from a server by communicating with the server using an Oblivious Transfer (OT) protocol to obtain a wire secret that is an encrypted version of an input of the first party; providing the encrypted wire secret to the second party; receiving an encrypted wire secret of the second party; receiving a garbled circuit corresponding to the function from the server for computation of an output; and wherein a predefined bit of the 0-secret of wire i in the garbled circuit is set to a random bit $b_i$ and a predefined bit of the 1-secret of wire i in the garbled circuit is set to $\neg b_i$; and storing the predefined bit of the wire of interest of the second party, and wherein the first party can verify input consistency by the second party over at least two executions by comparing the stored values for the at least two executions with the corresponding values obtained from the server.

The random bits $b_i$ can be generated using a pseudo random generator. The garbled circuit corresponding to the function can be computed based on an identifier for each of the parties. The comparison comprises, for example, comparing an exclusive OR (XOR) function applied to the values stored by the given party for the at least two executions to an output obtained from the server which computes them as an exclusive OR (XOR) function applied to corresponding values. The input consistency for the at least two executions is verified if the two XOR values are equal.

A more complete understanding of the present invention, as well as further features and advantages of the present invention, will be obtained by reference to the following detailed description and drawings.

BRIEF DESCRIPTION OF THE DRAWINGS

FIG. 1 is a block diagram of an improved generic two-party SFE system that can implement the processes of the present invention;

FIG. 2 illustrates pseudo code for an exemplary protocol that is a variation of the secure computation protocols based on Yao's garbling schemes;

FIG. 3 illustrates pseudo code for an exemplary GarbGen algorithm used by the server S in the protocol of FIG. 4 to create the garbled circuit for the i-th execution; and FIG. 4 illustrates pseudo code for an exemplary protocol incorporating input consistency verification aspects of the present invention.

DETAILED DESCRIPTION

Aspects of the present invention provide methods and apparatus for ensuring input consistency of the malicious parties of a server-assisted secure function evaluation across multiple executions. Consider, for example, an online dating application, where two parties, Alice and Bob, evaluate their compatibility by creating (and sometimes modifying) their profiles and matching them to their preferences. Once a certain input has been used by Alice in communication with Bob, Bob can always ask Alice to supply the same input in future communication, and vice versa. For example, once Bob supplies a profile that indicates he studies cryptography, Alice will be able to ensure that in all future SPE where the field of studies is involved, Bob will input cryptography. It is noted that some inputs may naturally change over time. The user with a changed profile attribute might simply inform the other user, if needed, that a particular attribute was updated. The computation will go through, and the other user will be additionally informed of the changed input.

Alice and Bob can verify, with the help of the server, S, that, for two SFE evaluations, a particular input wire is set to the same plaintext value. In the exemplary embodiments described herein, a party cannot verify consistency of two inputs of the other party without the other party's consent.

FIG. 1 is a block diagram of an improved SFE system 100 that can implement the processes of the present invention. As shown in FIG. 1, memory 130 configures the processor 120 to implement the SFE methods, steps, and functions disclosed herein (collectively, shown as 150 in FIG. 1, and discussed further below in conjunction with FIGS. 2 through 4). The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of computer system 100 can be incorporated into a personal computer, laptop computer, handheld computing device, application-specific circuit or general-use integrated circuit.

SPE Algorithms

Existing SPE algorithms typically employ Garbled Circuits (GCs). For a detailed discussion of GCs, see, for example, Andrew C. Yao, "Protocols for Secure Computations," Proc. 23rd IEEE Symp. on Foundations of Comp. Science, 160-164, (Chicago, 1982); or Andrew C. Yao," "How to Generate and Exchange Secrets," Proc. 27th IEEE Symp. on Foundations of Comp. Science, 162-167 (Toronto, 1986).

GC is secure against malicious circuit evaluator and semi-honest circuit constructor, therefore a semi-honest server S generates the garbled circuit for the chosen function (as communicated to S by both parties). As for inputs, an Oblivious Transfer (OT) extension is used in the exemplary embodiment to secure against malicious receivers and a semi-honest server. See, e.g., D. Harnik et al., "OT-Combiners via Secure Computation," TCC 5th Theory of Cryptography Conference 2008 (March 2008), Lecture Notes in Computer Science, Vol. 4948, 393-411 (2008); and/or Y. Ishai et al., "Extending Oblivious Transfers Efficiently," Advances in Cryptology—CRYPTO 2003 (August 2003), Lecture Notes in Computer Science, Vol. 2729, 145-161 (2003).

Each party runs above OT with the server to obtain wire secrets corresponding to their input. Then the parties send these wire secrets to the other party (and receive the other party's input secrets). The computed GC is then sent by S to both parties for evaluation (it is important to send the GC after the inputs have been delivered so that, e.g., parties cannot abort based on the output of SPE). At this point, each party can complete GC evaluation and compute their output.

The above is a complete solution with the exception of the input consistency verification provided by aspects of the present invention. Generally, for input consistency verification, the input wire secrets in the constructed (by S) garbled circuit will encode their corresponding plaintext values according to a secret stored by S. This can be done, for example, by S choosing and storing a random bit $b_i$ and setting the last bit of the 0-secret of wire i to $b_i$ and the last bit of 1-secret to be $\neg b_i$. Now, when, say, Bob, receives Alice's wire secret from Alice, he will store the last bit of the wire of interest. Note that effectively the plaintext value of this wire is shared between S and Bob. Now, when Bob wishes to confirm that plaintext values of two of Alice's wires across two executions are the same, he simply needs to compare the XOR of the two values he stored with the XOR of the corresponding values stored by S. If the XOR values are the same, then Alice supplied the same input. Indeed, in both good-behavior cases (Alice supplying either 0,0 or 1,1 in the two executions), Bob's stored bits will XOR to the XOR of the two stored bits of S. This check can be done "in plaintext", i.e., simply by S sending the corresponding XOR value to Bob. This approach is symmetrically applied to both players.

Finally, it is noted that the server generates the encoding bits $b_i$ using a Pseudo-Random Function Generator (PRFG), so the server does not need to store any of the plaintext encoding bits, as the server can always regenerate them from the master secret of the server, client identifiers and SPE identifier. Including client identifiers into the circuit generation seed derivation can be important. If not included, two malicious parties $P_1$, $P_2$ might open an honest Alice's input of execution $C_i$ by pretending that $C_i$ was their prior execution.

Notation

Let κ be the computational security parameter. The server S assists parties $P_1$ and $P_2$ to securely evaluate arbitrary functions over their inputs multiple times. In each iteration, S will be provided circuit $C_i$ that party $P_1$ with client id $id_1$, and input $x_i$, and party $P_2$ with client $id^2$, and input $y_i$, wish to evaluate. Let $x_{i,j}$ (resp. $y_{i,j}$) denote the j-th bit of $x_i$ (resp. $y_i$). Assume that $x_i$ (resp. $y_i$) is of length m (resp. n), and that $I_1$ (resp. $I_2$) represents the set of $P_1$'s (resp. $P_2$'s) input wires in $C_i$. Server S maintains a master secret a state, denoted by σ, across executions. Given a circuit $C_i$, and state σ, the server uses algorithm GarbGen(i, $C_i$, $id_1$, $id_2$, σ), as discussed further below in conjunction with FIG. 3, to generate a garbled version of $C_i$ which is denoted by $\tilde{C}_i$. In circuit $\tilde{C}_i$, $u_{i,j}$ (resp. $v_{i,kj}$) denotes the j-th input wire belonging to party $P_1$ (resp. $P_2$). For a wire $u_{i,j}$ (resp. $v_{i,j}$), the garbled values corresponding to 0 and 1 are referred to by $\tilde{u}_{i,j}^0$, $\tilde{u}_{i,j}^1$ (resp. $\tilde{v}_{i,j}^0$, $\tilde{v}_{i,j}^1$) respectively. While evaluating the garbled circuit, the evaluator will possess only one of two garbled values for each wire in the circuit. We let $\tilde{w}_{i,j}{}'$ denote the garbled value on wire $w_{i,j}$ that is possessed by the evaluator.

The exemplary protocols are designed in the random oracle model. In the following protocols H, E and H' represent hash functions that are modeled as non-programmable random oracles.

Server-Assisted Secure Computation with Input Consistency Verification

FIG. 2 illustrates pseudo code for an exemplary protocol 200 that is a variation of the secure computation protocols based on Yao's garbling schemes. Generally, the semi-honest server will generate the GC and distribute it to both players, after running the OT protocol.

In the protocol 200 of FIG. 2, $\tilde{C}_i$ is constructed by the server S and sent to both parties in line 9. Let input keys for $P_1$ be $\{\tilde{u}_{i,j}^0, \tilde{u}_{i,j}^1\}_{j \in I_1}$, and those corresponding to $P_2$ be $\{\tilde{v}_{i,j}^0, \tilde{v}_{i,j}^1\}_{j \in I_2}$.

Protocol 200 allows for multiple secure evaluations in the presence of an adversary that either passively corrupts S, or actively corrupts one of $P_1$, $P_2$.

Verifying Consistency Across Multiple Executions

Aspects of the present invention provide a new garbling scheme that will allow efficient consistency verification in the present setting. Recall that Yao's garbled circuit is constructed by choosing for each wire $w_{i,j}$, garblings $\tilde{w}_{i,j}^0$, $\tilde{w}_{i,j}^1$ at random from $\{0,1\}^\kappa$, and creating the garbled tables $\tilde{T}_{i,j}$ using any semantically-secure encryption scheme.

GC Encryption

The following encryption is employed in the GC garbling schemes. For simplicity of presentation, the random oracle model is employed.

Let $E: \{0,1\}^* \rightarrow \{0,1\}$ $\kappa$ be a random oracle. For encrypting the value x in the truth table of the l-th gate in the i-th execution, the following encryption scheme is used that takes two keys $k_a$, $k_b$ as follows:

$$Enc_{k_a,k_b}(x,i,l) = E(k_a \| k_b \| i \| l) \oplus x$$

FIG. 3 illustrates pseudo code for an exemplary GarbGen algorithm 300 used by S in the protocol 400 of FIG. 4 to create the garbled circuit for the i-th execution. The algorithm GarbGen takes the execution index i, the circuit $C_i$, and the server's state (master secret) σ to produce garbled circuit $\tilde{C}_i$. The exemplary GarbGen algorithm 300 is based on the following variation of the traditional Yao GC-based garbling scheme (and their benefits). Verifiable consistency across multiple executions is achieved by correlating the keys at the input (and output) levels. More precisely, the server S chooses at random his master secret $\sigma \in \{0,1\}$ $\kappa$, permanently stores it, and uses it in the following way to covertly "mark" each input wire with its plaintext label. Let $P_1$'s (resp. $P_2$) id be $id_1$ (resp. $id_2$), and H' $\{0,1\}^* \rightarrow \{0,1\}$ be a one-bit Random Oracle (RO). For $w_{i,j}$ that is the input wire of either $P_1$ or $P_2$: (1) the first κ–1 bits of $\tilde{w}_{i,j}^0$, $\tilde{w}_{i,j}^1$ are picked at random, and (2) the last bit of encoded wire $\tilde{w}_{i,j}^0$ is set to H'$(i\|j\|id_1\|id_2\sigma)$ in line 3, while the last bit of encoded wire $\tilde{w}_{i,j}^1$ is set to $\tilde{w}_{i,j}^0$'s last bit complement $1 \oplus H'(i\|j\|id_1\|id_2\|\sigma)$ in line 4. As discussed further below, correlating the keys in the manner described above will allow for efficient consistency verification. The remaining keys (i.e., those that do not correspond to input or output wires of $\tilde{C}_i$) are still picked at random from $\{0,1\}$ κ.

In the exemplary GarbGen algorithm 300, the wires garblings are generated at random. In practice, a PRFG could be used, such as AES.

FIG. 4 illustrates pseudo code for an exemplary protocol 400 incorporating input consistency verification aspects of the present invention. In line 410, the last bit of the encoded wire is stored by each party to the local state for a history, so that a consistency verification can be performed for a later input in section 420. In line 425, the parties ensure that the $j_1^{th}$ bit of execution $i_1$ is equal to the $j_2^{th}$ bit of execution $i_2$ (by prior agreement). In step 430, the server recomputes the last bit of $\tilde{w}_{i1,j1}^b$ and $w_{i2,j2}^b$ (for b=0 or 1 indifferently as long as it is the same in both values) and performs an exclusive OR (XOR) function and sends the result (c) to the parties. In step 435, if the input consistency verification fails, then the execution is aborted.

The server S does not store any local state other than the master secret σ.

Extensions

Information about the verification queries and the circuit $C_i$ can be revealed to the server S. It may be desirable to hide this information.

Private Verification Queries.

One exemplary embodiment preserves privacy of verification queries. Recall that in order to verify input consistency, parties need to retrieve the XOR of the least significant bits of the wire keys corresponding to wires specified in their queries. Note that these least significant bits can be obtained directly from the private state σ (i.e. the master secret) of S. This allows the following solution that preserves privacy of verification queries. Consider a circuit C' that takes as input queries $q_1$, $q_2$ from parties $P_1$ and $P_2$, and the private state σ of S, and computes the desired output (i.e., XOR of the least significant bits of the keys specified by the queries). Clearly, if C' is evaluated securely, i.e., while keeping queries $q_1$, $q_2$ private from S, and private state σ hidden from $P_1$ and $P_2$, then the problem is solved. The following efficient solution to securely evaluate C' using garbled circuits can be employed.

Model H' as a PRF (as opposed to RO) in order to allow C' to internally generate the keys from σ. (Modeling H' as a PRF does not violate the security of the construction in any way.) C' checks if $q_1 = q_2$ holds, and produces output only when this check passes. This is necessary in order to guarantee that the malicious party does not obtain information other than what the output of the honest query reveals.

Now, without loss of generality, suppose party $P_1$ wishes to verify input consistency. Parties simply securely evaluate C' on corresponding inputs, and use the output of this computation as discussed in consistency verification subprotocol of Protocol 400 as discussed above in conjunction with FIG. 4. Clearly, S will not know which wires are being verified. Two colluding parties $P_1$ and $P_2$ will not obtain output related to a third player, since H' used for evaluation of the marker bits is evaluated on inputs which include both client ids.

The above solution is efficient; in particular its complexity is independent of the number of past executions between $P_1$ and $P_2$.

Function Privacy.

Standard techniques such as universal circuits can be employed to preserve function privacy. An exemplary embodiment ensures that both parties provide the same function descriptors as input to the universal circuit to prevent a malicious party from evaluating an arbitrary function over the honest party's inputs. This issue is resolved using techniques similar to those employed when privacy of queries need to be preserved.

In more detail, let U' denote a circuit that takes as input two function descriptors $f_1, f_2$, and two inputs x and y. Circuit U' checks if $f_1 = f_2$, and if so, evaluates a universal circuit U on input $f_1$,x,y to produce output $f_1(x,y)$. Clearly, if U' is evaluated securely, i.e., while keeping function descriptors $f_1, f_2$ private from S, then the problem is solved. Secure evaluation of U' is performed in the same way as described in the setting where privacy of queries need to be preserved.

System and Article of Manufacture Details

While FIGS. 2 through 4 show an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for secure function evaluation (SFE) performed by a server for two parties that want to evaluate a function, comprising:
    computing a garbled circuit corresponding to said function and wherein a predefined bit of the 0-secret of wire i in said garbled circuit is set to a random bit $b_i$ and a predefined bit of the 1-secret of wire i in said garbled circuit is set to $\neg b_i$;
    communicating with each of said parties using an Oblivious Transfer (OT) protocol to provide wire secrets that are encrypted versions of the respective inputs of each party, wherein each party provides said wire secret that is an encrypted version of an input of said party to the other of said party; and
    sending the computed garbled circuit to each party for computation of a respective output; and wherein each party stores one of said predefined bit of the 0-secret of wire i and said predefined bit of the 1-secret of wire i of the other party, and wherein a given party can verify input consistency by the other party over at least two executions by comparing values stored by said given party for said at least two executions with corresponding values obtained from said server.

2. The method of claim 1, wherein said random bit $b_i$ is generated using a pseudo random generator.

3. The method of claim 1, wherein said step of computing said garbled circuit corresponding to said function is based on an identifier for each of said parties.

4. The method of claim 1, wherein said comparison comprises comparing an exclusive OR (XOR) function applied to the values stored by said given party for said at least two executions to an output obtained from said server which computes them as an exclusive OR (XOR) function applied to corresponding values.

5. The method of claim 4, wherein said input consistency for said at least two executions is verified if said two XOR values are equal.

6. A method for secure function evaluation (SFE) performed by a first of two parties that want to evaluate a function with assistance from a server, comprising:
    communicating with said server using an Oblivious Transfer (OT) protocol to obtain a wire secret that is an encrypted version of an input of said first party;
    providing said wire secret that is an encrypted version of an input of said first party to said second party;
    receiving an encrypted wire secret of said second party;
    receiving a garbled circuit corresponding to said function from said server for computation of an output; and wherein a predefined bit of the 0-secret of wire i in said garbled circuit is set to a random bit $b_i$ and a predefined bit of the 1-secret of wire i in said garbled circuit is set to $\neg b_i$; and
    storing one of said predefined bit of the 0-secret of wire i and said predefined bit of the 1-secret of wire i of the second party, and wherein said first party can verify input consistency by said second party over at least two executions by comparing stored values for said at least two executions with the corresponding values obtained from said server.

7. The method of claim 6, wherein said random bit $b_i$ is generated using a pseudo random generator.

8. The method of claim 6, wherein said step of computing said garbled circuit corresponding to said function is based on an identifier for each of said parties.

9. The method of claim 6, wherein said comparison comprises comparing an exclusive OR (XOR) function applied to the values stored by a given party for said at least two executions to an output obtained from said server which computes them as an exclusive OR (XOR) function applied to corresponding values.

10. The method of claim 9, wherein said input consistency for said at least two executions is verified if said two XOR values are equal.

11. A system for secure function evaluation (SFE) performed by a server for two parties that want to evaluate a function, comprising:
- a memory; and
- at least one hardware device, coupled to the memory, operative to:
- compute garbled circuit corresponding to said function and wherein a predefined bit of the 0-secret of wire i in said garbled circuit is set to a random bit $b_i$ and a predefined bit of the 1-secret of wire i in said garbled circuit is set to $\neg b_i$;
- communicate with each of said parties using an Oblivious Transfer (OT) protocol to provide wire secrets that are encrypted versions of the respective inputs of each party, wherein each party provides said wire secret that is an encrypted version of an input of said party to the other of said party; and
- send the computed garbled circuit to each party for computation of a respective output; and wherein each party stores one of said predefined bit of the 0-secret of wire i and said predefined bit of the 1-secret of wire i of the other party, and wherein a given party can verify input consistency by the other party over at least two executions by comparing values stored by said given party for said at least two executions with corresponding values obtained from said server.

12. The system of claim 11, wherein said random bit $b_i$ is generated using a pseudo random generator.

13. The system of claim 11, wherein said computed garbled circuit corresponding to said function is based on an identifier for each of said parties.

14. The system of claim 11, wherein said comparison comprises comparing an exclusive OR (XOR) function applied to the values stored by said given party for said at least two executions to an output obtained from said server which computes them as an exclusive OR (XOR) function applied to corresponding values.

15. The system of claim 14, wherein said input consistency for said at least two executions is verified if said two XOR values are equal.

16. The system of claim 11, wherein said input consistency comprises a same input over at least two executions.

17. A system for secure function evaluation (SFE) performed by a first of two parties that want to evaluate a function with assistance from a server, comprising:
- a memory; and
- at least one hardware device, coupled to the memory, operative to:
- communicate with said server using an Oblivious Transfer (OT) protocol to obtain a wire secret that is an encrypted version of an input of said first party;
- provide said wire secret that is an encrypted version of an input of said first party to said second party;
- receive an encrypted wire secret of said second party;
- receive a garbled circuit corresponding to said function from said server for computation of an output; and wherein a predefined bit of the 0-secret of wire i in said garbled circuit is set to a random bit $b_i$ and a predefined bit of the 1-secret of wire i in said garbled circuit is set to $\neg b_i$; and
- store one of said predefined bit of the 0-secret of wire i and said predefined bit of the 1-secret of wire i of the second party, and wherein said first party can verify input consistency by said second party over at least two executions by comparing stored values for said at least two executions with the corresponding values obtained from said server.

18. The system of claim 17, wherein said random bit $b_i$ is generated using a pseudo random generator.

19. The system of claim 17, wherein said computed garbled circuit corresponding to said function is based on an identifier for each of said parties.

20. The system of claim 17, wherein said comparison comprises comparing an exclusive OR (XOR) function applied to the values stored by a given party for said at least two executions to an output obtained from said server which computes them as an exclusive OR (XOR) function applied to corresponding values.

21. The system of claim 20, wherein said input consistency for said at least two executions is verified if said two XOR values are equal.

22. The system of claim 17, wherein said input consistency comprises a same input over at least two executions.

* * * * *